United States Patent
James et al.

(10) Patent No.: US 10,599,922 B2
(45) Date of Patent: Mar. 24, 2020

(54) FISH BIOMASS, SHAPE, AND SIZE DETERMINATION

(71) Applicant: X Development LLC, Mountain View, CA (US)

(72) Inventors: Barnaby John James, Los Gatos, CA (US); Evan Douglas Rapoport, Santa Cruz, CA (US); Matthew Messana, Sunnyvale, CA (US); Peter Kimball, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 149 days.

(21) Appl. No.: 15/879,851

(22) Filed: Jan. 25, 2018

(65) Prior Publication Data

US 2019/0228218 A1 Jul. 25, 2019

(51) Int. Cl.
*G06N 3/08* (2006.01)
*A01K 61/95* (2017.01)
(Continued)

(52) U.S. Cl.
CPC .......... *G06K 9/00369* (2013.01); *A01K 61/95* (2017.01); *G06K 9/00201* (2013.01);
(Continued)

(58) Field of Classification Search
CPC ............... A01K 61/95; G06K 9/00369; G06K 9/00201; G06T 7/62; G06T 7/593; G06T 2207/20084; G06N 3/08
See application file for complete search history.

(56) References Cited

U.S. PATENT DOCUMENTS

| 4,589,223 A * | 5/1986 | Hastings ................ A01K 85/01 |
| | | 43/42.24 |
| 7,173,197 B1* | 2/2007 | Kasperek ............... A01K 97/00 |
| | | 177/131 |

(Continued)

FOREIGN PATENT DOCUMENTS

| WO | WO 2016192853 | 12/2016 |
| WO | WO 2017001971 | 1/2017 |
| WO | WO 2017204660 | 11/2017 |

OTHER PUBLICATIONS

PCT International Search Report and Written Opinion in International Appln. PCT/US2018/064008, dated Apr. 16, 2019, 22 pages.

(Continued)

*Primary Examiner* — Santiago Garcia
(74) *Attorney, Agent, or Firm* — Fish & Richardson P.C.

(57) ABSTRACT

Methods, systems, and apparatuses, including computer programs encoded on a computer-readable storage medium for estimating the shape, size, and mass of fish are described. A pair of stereo cameras may be utilized to obtain right and left images of fish in a defined area. The right and left images may be processed, enhanced, and combined. Object detection may be used to detect and track a fish in images. A pose estimator may be used to determine key points and features of the detected fish. Based on the key points, a three-dimensional (3-D) model of the fish is generated that provides an estimate of the size and shape of the fish. A regression model or neural network model can be applied to the 3-D model to determine a likely weight of the fish.

20 Claims, 6 Drawing Sheets

(51) Int. Cl.
*G06T 7/593* (2017.01)
*G06T 7/62* (2017.01)
*G06K 9/00* (2006.01)

(52) U.S. Cl.
CPC ............. *G06N 3/08* (2013.01); *G06T 7/593* (2017.01); *G06T 7/62* (2017.01); *G06T 2207/10012* (2013.01); *G06T 2207/20084* (2013.01)

(56) References Cited

U.S. PATENT DOCUMENTS

| | | | | |
|---|---|---|---|---|
| 8,351,656 | B2* | 1/2013 | Spicola | A01K 29/00 356/4.03 |
| 9,298,978 | B1* | 3/2016 | Hlatky | G06K 9/00369 |
| 10,055,685 | B1* | 8/2018 | Arel | G06N 20/00 |
| 10,191,489 | B1* | 1/2019 | Rapoport | G05D 1/0088 |
| 2006/0018197 | A1 | 1/2006 | Burczynski et al. | |
| 2008/0137104 | A1* | 6/2008 | Lillerud | A01K 61/90 356/627 |
| 2010/0236137 | A1* | 9/2010 | Wu | C10L 1/026 44/385 |
| 2011/0196661 | A1* | 8/2011 | Spicola | A01K 29/00 703/11 |
| 2014/0270395 | A1* | 9/2014 | Jones | G06T 7/62 382/110 |
| 2015/0055827 | A1* | 2/2015 | Bailey | G08C 17/02 382/103 |
| 2015/0216192 | A1* | 8/2015 | Jacobsen | A22C 25/00 700/275 |
| 2015/0294641 | A1* | 10/2015 | Jones | G06T 1/0007 345/520 |
| 2016/0192630 | A1* | 7/2016 | Kennedy | A01K 97/00 43/4.5 |
| 2018/0365246 | A1* | 12/2018 | Laster | A01K 61/95 |
| 2019/0037865 | A1* | 2/2019 | Pettersen | A01K 61/95 |

OTHER PUBLICATIONS

Shortis et al, "A review of techniques for the identification and measurement of fish in underwater stereo-video image sequences," Proceedings of SPIE, May 23, 2013, 12 pages.

Lines et al. "An automatic image-based system for estimating the mass of free-swimming fish," Computers and Electronics in Agriculture, 31.2, Apr. 2001, 18 pages.

Hockaday et al. "Using truss networks to estimate the biomass of Oreochromis noliticus and to investigate shape characteristics," Journal of Fish Biology vol. 57.4, Oct. 2000, 20 pages.

'Wikipedia.com [online],' "Recurrent neural network" Dec. 12, 2017 [retrieved on Feb. 11, 2019], Retrieved from: URL<https://en.wi kipedia.org/w/index.php?title=Recurrent_neural_network &oldi d=815031836>,17 pages.

Lines et al, "An automatic image-based system for estimating the mass of free-swimming fish," Computers and Electronics in Agriculture, Apr. 2001, 31(2):151-168.

PCT Invitation to Pay Additional Fees and, Where Applicable, Protest Fee/ Prosecution. No. PCT/US2018/064008, dated Feb. 22, 2019, 8 pages.

Xiu et al, "Accelerating fish detection and recognition by sharing CNNs with objectness learning," Oceans, Apr. 2016, 5 pages.

* cited by examiner

FISH BIOMASS, SHAPE, AND SIZE DETERMINATION

FIELD

This disclosure generally relates to the marine monitoring systems.

BACKGROUND

Researchers have often found determining the weight and size of fish difficult. A manual process of catching and weighing a sample set of fish is often used to estimate the size and weight of a larger number of fish in an area. However, such a process is time-consuming, inaccurate, and requires substantial financial, logistical, and human resources.

SUMMARY

In general, innovative aspects of the subject matter described in this specification relate to determining the shape, size, and weight of fish. In some implementations, a pair of stereo cameras may be utilized to obtain right and left images of fish in a defined area. The right and left images may be processed, enhanced, and combined. Object detection may be used to detect and track a fish in images. A pose estimator may be used to determine key points and features of the detected fish. Based on the key points, a three-dimensional (3-D) model of the fish is generated that provides an estimate of the size and shape of the fish. A regression model or neural network model may be applied to the 3-D model to determine a weight of the fish.

In some implementations, the operations noted above may be repeated and multiple 3-D models and weights may be determined for a fish. The multiple models and weights may be averaged to provide results with a greater degree of reliability. In some implementations, each 3-D model of a fish may be evaluated and a score is generated to rank the accuracy of a 3-D model. Only 3-D models that have a score greater than a threshold score may be utilized to determine the weight of the fish.

Aspects of the subject matter described in this specification can be embodied in a computer-implemented method. The method includes obtaining, by one or more processors, one or more images of a fish; determining one or more key points associated with one or more features of the fish in the one or more images; generating, by the one or more processors, a model of the fish based on the one or more key points associated with the one or more features of the fish; determining a likely weight of the fish using the model of the fish; and outputting the likely weight of the fish for display or storage at a device connected to the one or more processors In some implementations, the method further includes generating a single image from the one or more images; generating a depth map for the single image; and identifying the fish and one or more regions of interest in the single image by performing object detection using a recurrent convolutional neural network.

In some implementations, the one or more key points associated with the one or more features of the fish are determined for each of the one or more regions of interest using pose estimation. The one or more images are obtained using one or more image acquisition devices that include a left camera and a right camera, and the one or more images include a left image and a right image.

In some implementations, the determined one or more key points include one or more two-dimensional key points, and generating the model of the fish includes determining three-dimensional key points for the fish by using the determined one or more two-dimensional key points and the depth map.

In some implementations, determining a likely weight of the fish using the model of the fish includes estimating the weight of the fish by applying a linear regression model to the model of the fish. The model of the fish is a three-dimensional model of the fish.

In some implementations, the method further includes obtaining one or more secondary images of the fish; determining a likely secondary weight of the fish based on the obtained one or more secondary images of the fish; and determining an average likely weight based on the determined likely weight of the fish using the model of the fish and the determined likely secondary weight of the fish based on the obtained one or more secondary images of the fish.

In some implementations, the method further includes training a neural network classifier using a pose estimation model to predict likely key points of the fish.

Other aspects include corresponding methods, systems, apparatus, computer-readable storage media, and computer programs configured to implement the operations of the above-noted methods.

The above-noted aspects and implementations further described in this specification may offer several advantages. For example, because the determination of fish weight relies on images obtained from cameras, the system may be selective in which images are chosen for determining weight because a large number of images can be obtained at a relatively cost. This selectively provides a greater degree of accuracy in the weight determination. Further, fewer images may need to be processed to obtain accurate results thereby also providing the benefit of reducing required processing time and resources.

In some implementations, a single fish or a population of a large number of fish may be continuously monitored and a profile may be created for each fish. Thus, for users who are interested in verifying the age, history, or quality of a fish, this system provides comprehensive information about a fish and its physical changes and qualities. The fish profiles may be provided to any interested party.

In addition, neural networks and machine learning techniques used to implement pose estimation and feature identification provide an adaptive system, which can continuously be trained using previous results and training data to improve the accuracy of feature identification and estimation of the size and weight of a fish. Since cameras and image processing techniques are used to identify fish and estimate their weight and size, the reliance on humans to catch fish to determine fish characteristics is reduced. The implementations described herein also provide greater accuracy and consistency in determining fish size and weight. Additionally, the systems can be scaled to cover larger areas of fish relatively easily by adding more cameras in additional locations.

The details of one or more aspects described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Aspects of the disclosed subject matter are described in further detail with respect to the figures.

Figure 1A:
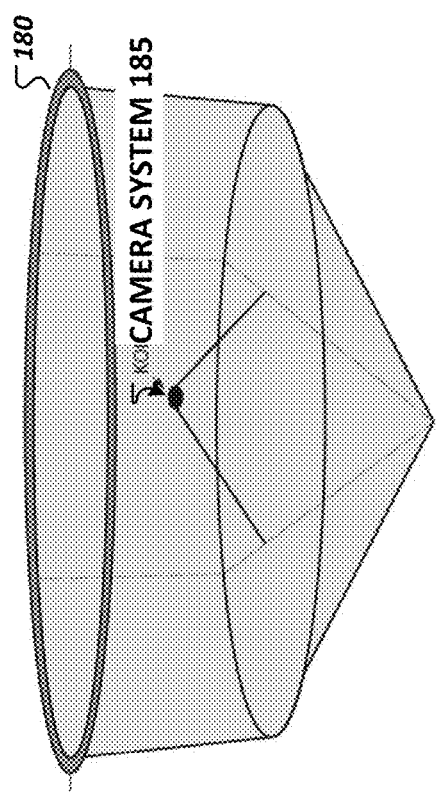
FIG. 1A depicts a lateral view of an exemplary fish tank with a fish monitoring system.
Figure 1B:
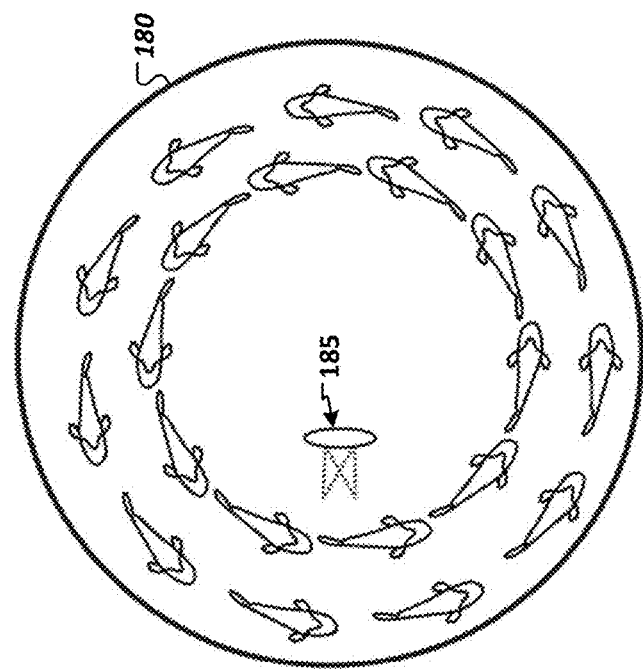
FIG. 1B depicts an aerial view of an exemplary fish tank with a fish monitoring system.

FIGS. 1A and 1B depict a lateral view and an aerial view, respectively, of a fish tank 180 with a fish monitoring system. The tank 180 may have various shapes and sizes. FIGS. 1A and 1B depict an exemplary implementation in which the tank includes a cone base with a circular or cylindrical top. The tank 180 may include different types of water, e.g., fresh water, salt water, water at different salinity levels, and may include one or more species of fish. The tank 180 may be made of any suitable material, such as glass, concrete, acrylic, plastic, or combinations thereof. Additional devices such as air pumps, water pumps, lighting systems, heating and cooling systems, and filtering systems may be used to regulate conditions in the tank 180.

The fish monitoring system may include multiple devices and sensors such as light sensors, thermometers, filters, salinity sensors, and image acquisition systems. The image acquisition systems may include a camera system 185 with one or more cameras configured to obtain images and videos of fish in the tank 180.

As described in further detail below, the camera system 185 may be connected to a computer system located outside the tank 180. The computer system may control multiple parameters of the cameras such as position, lens focal length, or zoom, and may control the camera system 185 to obtain still or moving images of fish. The camera system 185 may include a motor configured to maneuver cameras in particular directions based on instructions received from the computer system. The computer system may receive the images from the camera system 185 for further processing.

The camera system 185 may be deployed in different locations within a tank 180. In general, the camera system 185 may be located at a position in the tank 180 that enables images of good quality, e.g., clear images of fish without blurriness and optimal capture angle and view, to be captured by the camera system 185. For example, as illustrated in FIGS. 1A and 1B, the camera system 185 may be located in a relatively central location of the tank 180. The camera system 185 may be held in position in the tank 180 in various ways such as by using a surface buoy, sub-surface buoys, fixed structures, or cable lines.

Figure 2:
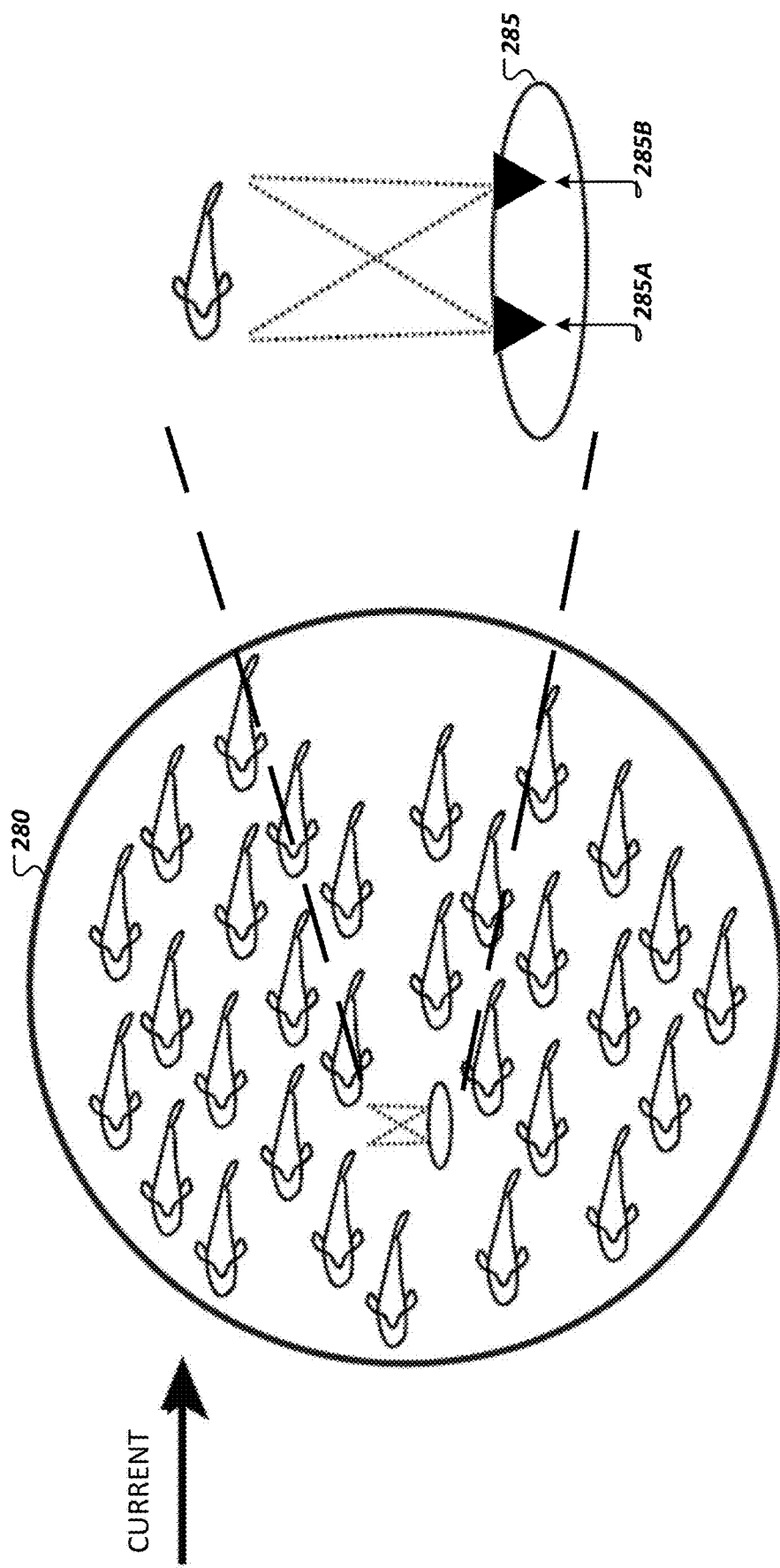
FIG. 2 depicts a top view of an image acquisition system that captures images of fish in a fish tank.

Various factors may determine the position of the camera system 185 in the fish tank 180. For instance, in some cases, if fish in the tank 180 are the type of fish that swim against the current, the camera system 185 may be positioned substantially parallel to the current, as depicted in FIG. 2. Other fish may swim with the current or may not have swimming patterns that are dependent upon a current. In some cases, the particular species of fish in the fish tank 180/280 may swim at particular depths or areas that have particular temperatures or amounts of light, and the camera system 185/285 may be positioned within the tank 180/280 to enable cameras 285A and 285B to focus on fish in these particular depths or areas.

As shown in FIG. 2, a camera system 285 in a fish tank 280 may include a plurality of cameras, such as a left stereo camera 285A and a right stereo camera 285B or an upper camera and a lower camera. In general, various camera configurations may be used. Each of the cameras 285A and 285B may be positioned to obtain images and videos of fish in the fish tank 280. In some implementations, the cameras 285A and 285B may be positioned to obtain images of fish at approximately perpendicular angles relative to the fish so that a lateral view of one or more fish may be obtained. The multiple cameras 285A and 285B may provide more than one image for a particular fish from slightly different angles. The multiple images may be used to improve characterization of the fish as described below with respect to FIGS. 3A and 3B.

In some implementations, the cameras 285A and 285B in the camera system 285 are calibrated before obtaining fish images. To calibrate the cameras 285A and 285B, the cameras 285A and 285B may capture images of reference patterns at different angles and distances relative to the camera lens, and a room mean square (RMS) error may be calculated by determining the difference between the captured images of the patterns and the reference patterns. If the RMS error satisfies an error threshold, settings of the cameras 285A and 285B may be adjusted to recalibrate the cameras 285A and 285B. Adjusting the settings of the cameras 285A and 285B may include any operation that modifies a captured reference image. The operations may include, but are not limited to, one or more of adjusting a position of a camera, adjusting a lens position of the cameras 285A and 285B, and adjusting an amount of zoom of the cameras 285A and 285B.

After adjusting the settings of the cameras 285A and 285B, another set of images may be captured and a second RMS error may be calculated. The calibration process may be repeated until the RMS error no longer satisfies the error threshold.

Figure 3A:
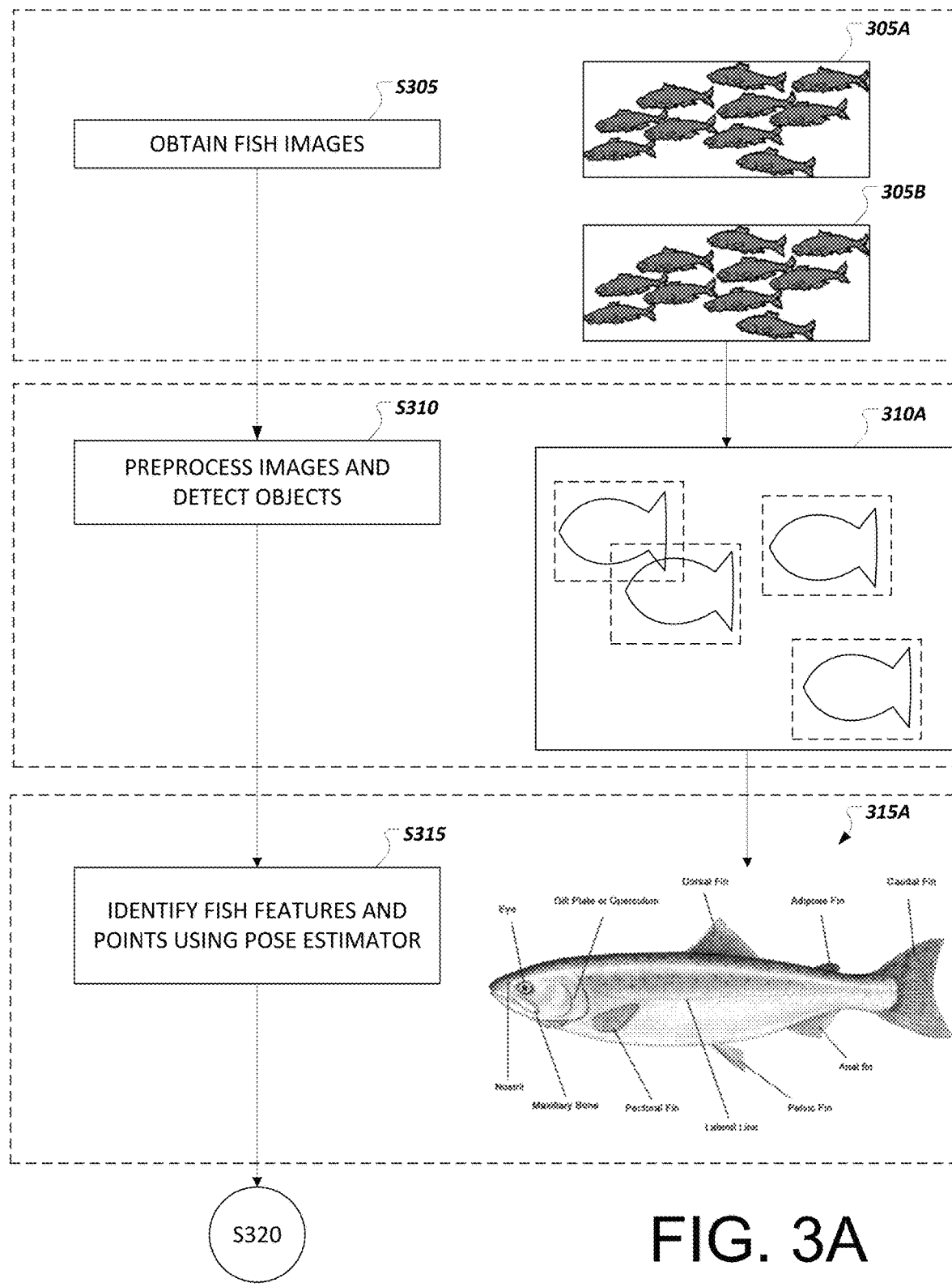
FIGS. 3A and 3B depict an exemplary flow diagram of a method for determining a size, shape, and weight of a fish.
Figure 3B:
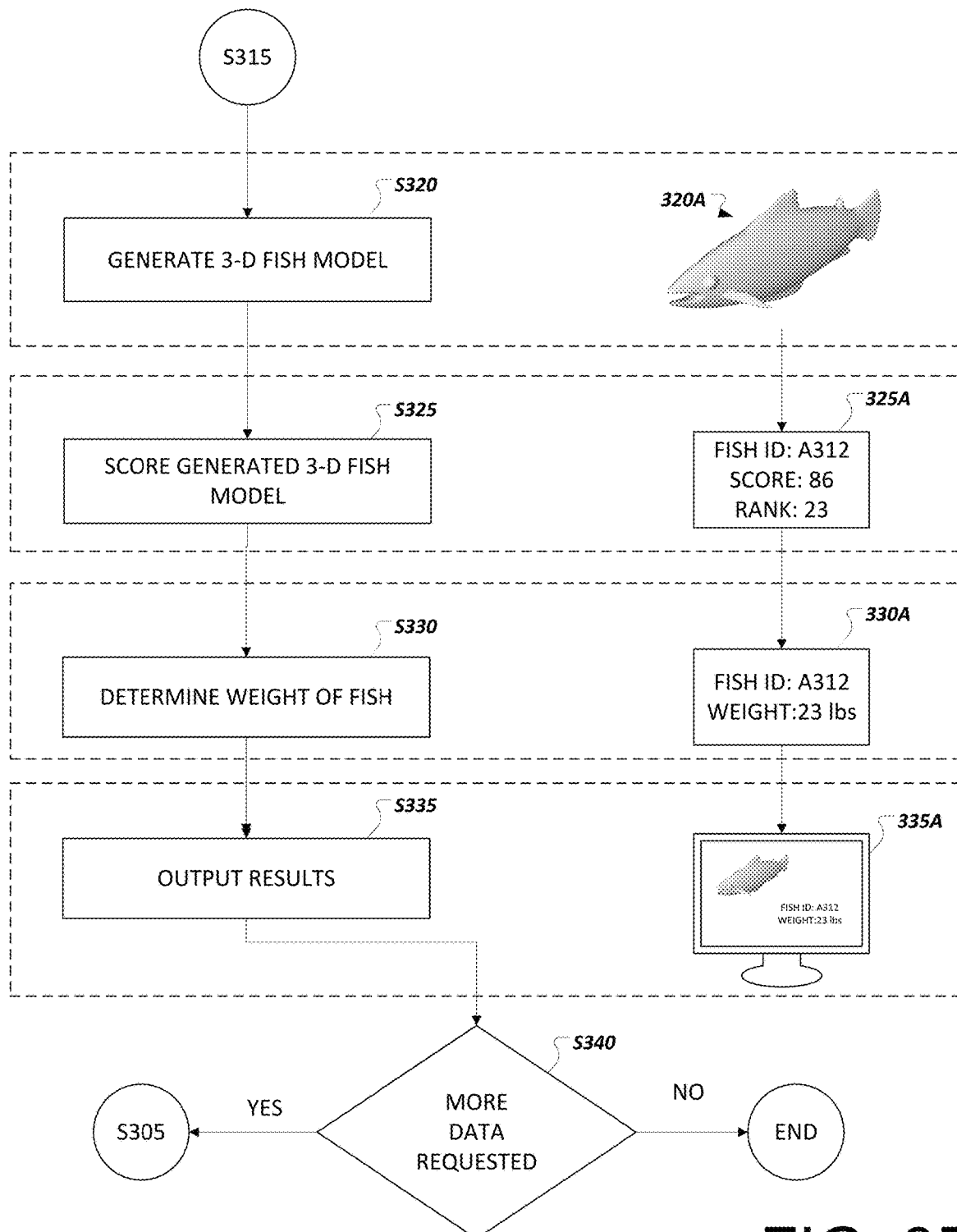

FIGS. 3A and 3B depict an exemplary flow diagram of a method for determining a size, shape, and weight of a fish. The method may be implemented by the system described further with reference to FIG. 4. The system may include cameras that are calibrated as described above and configured to obtain one or more images of fish in a fish tank (S305). The images may include a left stereo image 305A and a right stereo image 305B obtained from a left stereo camera and a right stereo camera, respectively.

The captured images 305A, 305B may be preprocessed (S310). The preprocessing may include image enhancement and rectification. For example, images 305A, 305B may be enhanced by performing one or more of histogram equalization, filtering, dehazing, deblurring, or denoising to improve image quality. In some cases, light levels may be boosted, for example, by merging multiple images obtained in a burst mode. In some cases, color in an image may be enhanced by performing adaptive histogram equalization.

In some cases, in response to capturing images 305A, 305B with poor image quality, the cameras may be recalibrated as described above. For example, a captured image 305A or 305B may be evaluated to determine a quality of the image or the depiction of a fish in the image. If the image 305A or 305B is significantly blurred, has occlusions, or the fish is at an undesired angle relative to the camera (e.g., a longitudinal axis of the fish is not perpendicular to the camera), the cameras may be recalibrated and another image may be captured.

In some implementations, as part of the preprocessing, an identification of a fish in an obtained image may be determined. For example, a fish that has been tagged or marked using methods such as, e.g., morphological marks, genetic marks, microtags, passive integrated transponder tags, wire tags, radio tags, may be identified by its tag or marker. In some implementations, obtained images may be examined to identify a unique spot pattern of a fish. This unique dot pattern may correspond to a signature of the fish and may be used to identify the fish in subsequent and previous images.

In some implementations, as part of the preprocessing, the left and right stereo images 305A and 305B may be combined to form a single image using any suitable image combination or merging technique such as stereo correspondence techniques. Object detection may be performed to detect fish in multiple, preprocessed images or the single, preprocessed image 310A (S310). In some implementations, faster recurrent convolutional neural network (RCNN) may be utilized to perform the object detection.

In some implementations, semantic segmentation may be performed to segment a fish in an image from the background in the image. Semantic segmentation may make it easier analyze detailed features of a fish. In general, various suitable object detection techniques may be used to detect fish in a single, preprocessed image 310A.

As shown in FIG. 3A, bounding boxes may be used to identify detected objects in an image 310A. The bounding boxes may include measured dimensions based on depth measurement and an indication of a margin of error in the measured dimensions. The bounding boxes or detected objects may correspond to regions of interest in the image 310A such as the images of fish in the image 310A. If multiple frames are being processed, a nearest neighbor algorithm may be used to find the most likely match of objects between frames.

In some implementations, a depth map may be generated to determine a distance of a fish from the camera. The depth map may be generated using any suitable technique. For example, Rayleigh scattering or image array depth reconstruction may be used to create a depth map. In addition, one or more of stereoscopic cameras, sonars, acoustic cameras, or lasers may be utilized to determine the distance of a fish from the camera lens.

After detecting a fish in one or more images, e.g., a combined single image, a stereo image pair, or a sequence of images, and using bounding boxes to identify regions of interest, a pose estimator may be used to identify key points in each region of interest (S315). The pose estimator is described further with reference to FIG. 4. In some implementations, the pose estimator may execute DeepPose operations, multi-fish pose estimation operations, or convolutional neural network operations. As shown in image 315A (an enlarged version is shown in FIG. 5), the key points may be associated with features of the fish such as an eye, nostril, gill plate, operculum, auxiliary bone, pectoral fin, lateral line, dorsal fin, adipose fin, pelvic fin, anal fin, and caudal fin. Key points may be labeled by numerical coordinates reflecting pixel positions in an image and may be associated with a particular feature of the fish.

In some implementations, when the key points and associated features may be partially occluded or non-viewable in an image, the pose estimator can still identify likely key points and associated features based on the probability of a key point and associated feature being present at a particular location. The probability of a key point location may be based on one or more of a likely shape, size, or type of the fish in the image or the location of other features of the fish. For example, using FIG. 5 as a reference, even though the adipose fin may not be shown in an image, the location of the adipose fin may be estimated using a probability model based on the position of the caudal fin and the dorsal fin in the image.

Next, a 3-D model 320A of the fish may be generated using the identified key points associated with features of the fish (S320). In general, various 2-D to 3-D conversion techniques may be used. For example, in some implementations, key points in the 2-D images may be mapped to a 3-D model 320A of the fish using the depth map. The depth map may be determined using various techniques such as a block matching algorithm, depth from motion, or stereo processing by semiglobal matching and mutual information. Objects, i.e., fish, in the stereo images (e.g., left and right images) may be detected, the depths from the cameras determined, and disparities between the images and detected objects may be used to generate the 3-D model 320A. The 3-D model 320A provides an estimated shape and size of the imaged fish.

In some implementations, the generated 3-D model 320A may be scored and ranked. The score and rank reflects a quality factor of a generated 3-D model and the captured image of a fish. The scoring of the model 320A may be determined based on a number of parameters including one or more of an elevation angle of a fish relative to the camera, a flatness level of the fish relative to the camera, a pose or perpendicularity of the fish relative to the camera, a distance of the fish relative to the camera, or neural network models for scoring particular poses. Values for the elevation angle, flatness level and perpendicularity of the fish and the distance of the fish from the camera may be determined in the previous operations such as when determining a depth map and determining the locations of key points. In some cases, the various parameters may be assigned different weights.

For example, in some cases, fish having higher elevation angles or fish at greater distances from the camera may have a lower score. In some cases, images of fish in which the fish does not appear relatively perpendicular or flat to the camera may be scored lower. In some cases, the number of determined key points may be used to calculate a score. For example, a higher score may be given to images for which a greater number of key points were determined from the image or fewer key points were determined using a probability model due to a lack of one or more key points being visible in the image. In general, the higher the score, the better the quality of the image and 3-D model.

The score of the 3-D model 320A may be ranked alongside other scores of 3-D models for the same fish, if available (S325). For example, as shown in item 325A in FIG. 3B, the 3-D model 320A of a fish assigned an identification, such as A312, has a score of 86 and is ranked 23. In general, various types of scoring systems and ranking systems using the criteria described above may be utilized.

If the score or ranking satisfies a threshold, the 3-D model 320A may be utilized to determine a weight of the fish (S330). For example, if the threshold is a score of 85 or higher or a rank of 25 or higher, the 3-D model 320A may satisfy the threshold based on the score and rank shown in item 325A. The threshold may be set differently for different fish, environments, or fish tanks.

To determine the weight of the fish, a linear regression model may be used to map the 3-D model 320A to a weight. For example, the coordinates of key points in the 3-D model 320A may be used to determine distances between two key points, and the determined distances and key points may be input into a linear regression model to determine an estimated weight of the fish. As shown in item 330A of FIG. 3B, the imaged fish having an ID of A312 may have an estimated weight of 23 lbs.

The estimated weight, shape, size, and 3-D model of a fish captured in an image may then be output as results (S335). The results may be output in several manner. For example, in some cases, the 3-D model 320A and the estimated weight, shape, and size may be displayed on the display 335A of a computer device. In some cases, the results may be stored in a fish profile for the fish in a database. The results may be added or aggregated to previous results associated with the fish. New average values for the weight and size dimensions may be determined periodically or each time new results are generated.

In some implementations, the stored fish data could provide a track record of the fish. For example, a fish could be tracked through its lifetime in a fish tank. A fish may be tracked from birth and through its growth to a fully developed adult fish. As such, details of the timing and type of changes a fish underwent may be recorded. If a party, such as a researcher or fish purchaser, is interested to learn more about a fish's history, the fish database may be queried to retrieve information about the fish's history.

In some implementations, the results may be provided to train the pose estimator. For example, an image of a fish and its determined 3-D model, estimated weight, shape, and size may be provided as a reference to train the pose estimator as training data or to use as a weighted average for the overall fish weight computation. If feedback for the results is available, the feedback may also be provided as training data. For example, if a reviewer after viewing the results indicates that the results are poor estimates, the reviewer's feedback may be provided as training data to the pose estimator.

In general, fish may be tracked over long periods of time and over short periods of time. For short-term tracking, a continuous video of the fish may be obtained by controlling a camera system so that cameras in the camera system may continuously capture images of the fish as it moves. In some cases, the camera system may be programmed to automatically track fish movement. In some cases, the camera system may be controlled manually by a user, e.g., systems administrator, to track fish movement.

For long-term tracking, periodic images of a fish may be obtained, for example, every few days, weeks, or months. Methods to identify the fish may be used to confirm the identity of a fish in an image, and update the identified fish's profile. For example, in some cases, the method to identify a fish may include extracting features from a fish image through representation learning that uses a metric loss to learn a feature extractor based on positive image samples, i.e., the same fish, and negative image samples, i.e., different fish, of the fish. In some cases, hand engineering may be used to extract features from a fish image.

The result of the feature extraction is a function mapping images of the fish to a vector in a high dimensional vector space. Each detection of a fish in an image is either a new observation (first sight) or is close to a cluster of other examples (repeat visit). Clustering algorithms (e.g. K-means or Mixture of Gaussians) may be used to compute clusters. Over time as the fish mature, the cluster may drift or expand and this evolution can be tracked.

Referring back to FIG. 3B, in some implementations, after determining the weight of an imaged fish, the system may determine if more data for the fish is requested by a user or required. If more data for the fish is requested or required, the system will repeat the operations in FIGS. 3A and 3B beginning from operation S305. If no more data for the fish is requested or required, the method for determining a fish's weight, shape, and size may be terminated.

The request for additional data for the fish may be explicit or implicit. For example, in some cases, the system may be programmed to obtain multiple sets of data to determine an average weight of a fish, and the measurements may be repeated until the requisite number of data sets has been obtained. In some cases, the system may receive a request from a user to obtain additional data for a particular fish.

Figure 4:
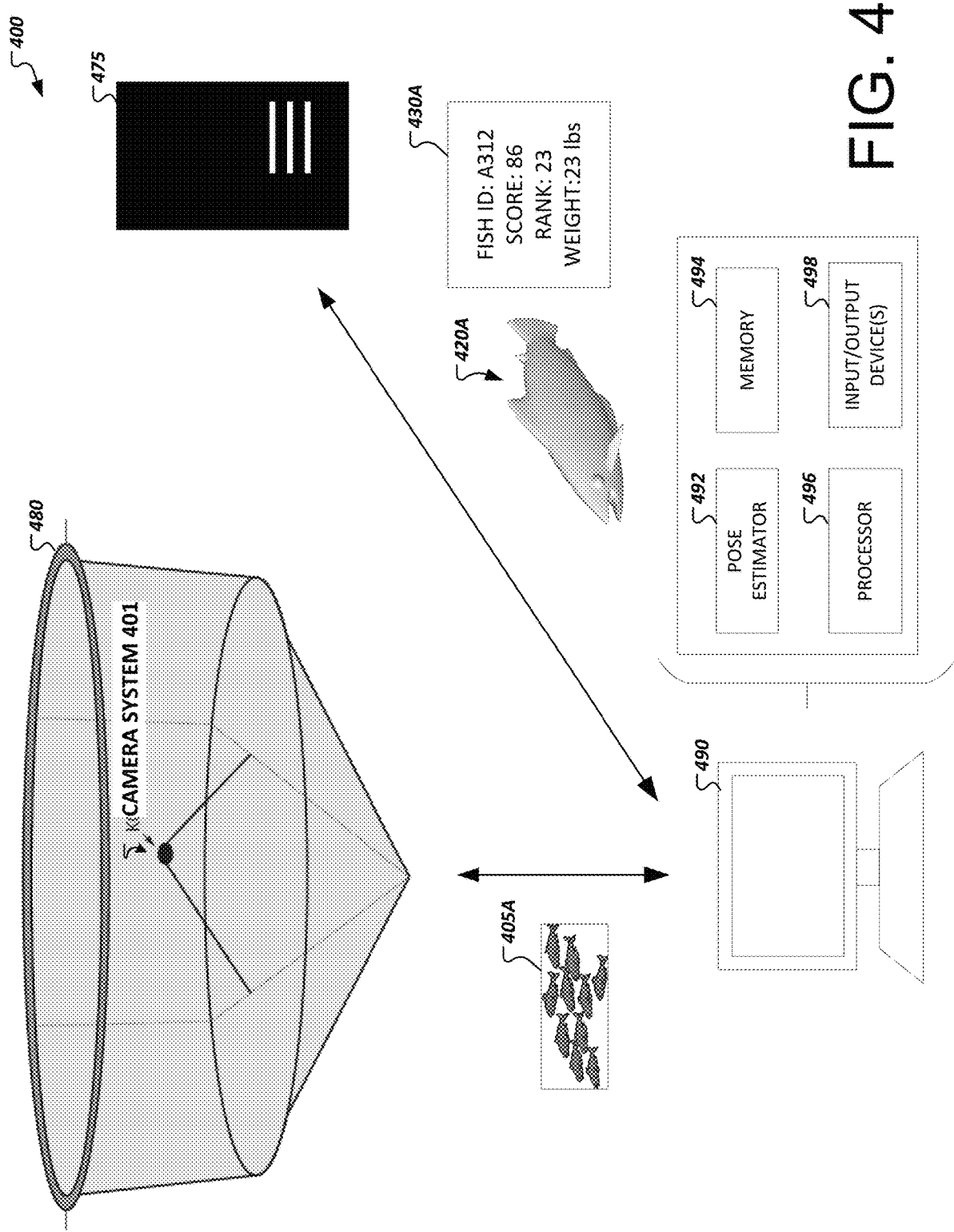
FIG. 4 depicts an exemplary system for determining a size, shape, and weight of a fish.
Figure 5:
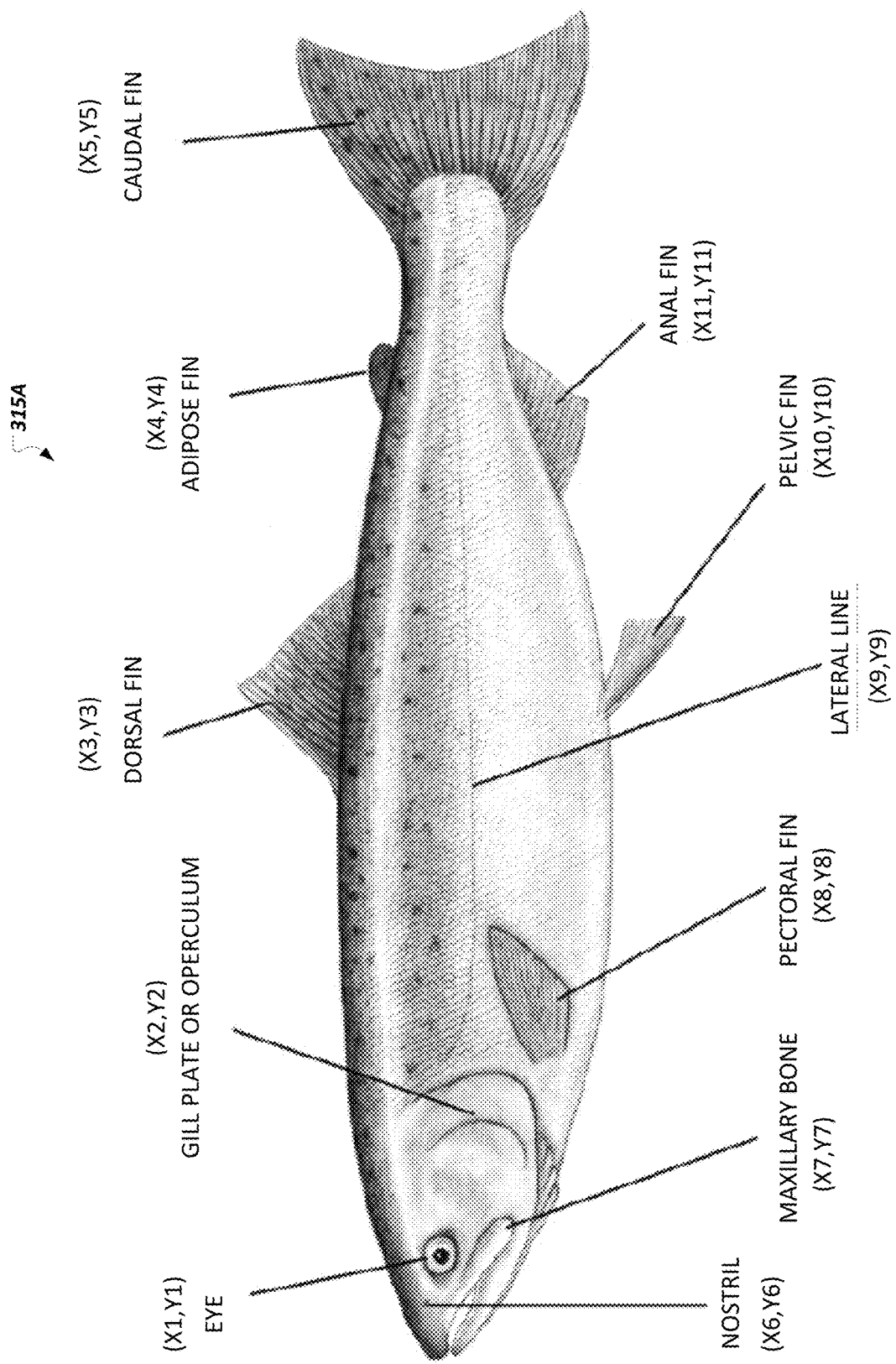
FIG. 5 depicts an image of an example fish with labels corresponding to features of the fish.

FIG. 4 depicts an exemplary system 400 for determining a size, shape, and weight of a fish. The system 400 may include a fish tank 480, a computing device 490, and a server 475. The fish tank 480 corresponds to the fish tank described with reference to FIGS. 1A, 1B, and 2. The fish tank 480 may include a fish monitoring system that includes multiple sensors, such as light sensors, thermometers, filters, salinity sensors, and a camera system 401.

The camera system 401 may include one or more video/photographic cameras, stereo cameras, or optical sensing devices configured to capture images. For instance, the camera system 401 may be configured to capture images of one or more fish at various depths and lighting conditions in tank 480. The camera system 401 may be configured to capture single, static images of fish and also video images of fish in which multiple images of fish may be periodically captured. The camera system 401 may be controlled based on commands received from the computing device 490.

The camera system 401 may be triggered by several different types of techniques. For instance, motion sensors may be built into the camera system 401 and used to trigger the camera system 401 to capture one or more images when motion is detected. In some implementations, the camera system 401 is configured to receive a command to capture an image from the computing device 490 or a sensor.

In some examples, the camera system 401 may trigger integrated or external illuminators (e.g., Infrared, Z-wave controlled "white" lights, lights controlled by the computing device 490) to improve image quality when light is deficient. An integrated or separate light sensor may be used to determine if illumination is desired. Activating the illuminators may result in increased image quality.

The camera system 401 may be programmed with any combination of time/day schedules, system activation commands, or other variables to determine when images should be captured. The camera system 401 may enter a low-power mode when not capturing images. In some cases, the camera system 401 may be powered by internal, replaceable batteries. In some cases, the camera system 401 may employ a small solar cell to recharge the battery when light is available.

The camera system 401 may be connected to computing device 490 through cables, and data, such as image 405A, may be communicated to the computing device 490 through the cables. The computing device 490 may include a pose estimator 492, memory 494, processor 496, and input/output devices 498. The pose estimator 492 may include a neural network and may be trained using training data and various machine learning methods. The training data may include numerous images of fish with variations in the positions and type of features. Based on the training, the pose estimator 492 may determine probable locations of the fish features and variations in the properties of the features, such as a shape, size, and color of the feature. The pose estimator 492 may also be trained to determine how the variations in the shape and size of a fish and locations of features in the fish affect the weight of a fish.

Memory 494 may be implemented as one or more mass storage devices, for example, magnetic, magneto optical disks, optical disks, EPROM, EEPROM, flash memory devices, and may be implemented as internal hard disks, removable disks, magneto optical disks, CD ROM, or DVD-ROM disks for storing data. In some implementations, the memory 494 may store fish profile data, which may include size, shape, weight, score, and ranking data associated with each profiled fish. The fish profile data may also include one or more images and 3-D models of the fish. In some implementations, memory 494 may store training data for training the pose estimator 492 and data for training the RCNN.

Input/output devices 498 may include input devices such as a keyboard, a pointing device, a mouse, a stylus, and/or a touch sensitive panel, e.g., a touch pad or a touch screen. Output devices may include displays, screens, speakers, and, in general, any device that can output digital data. Input/output devices 498 may also include a transceiver that includes a transmitter and a receiver and may be utilized to communicate with server 475. The transceiver may include amplifiers, modulators, demodulators, antennas, and various other components. The transceiver may transfer or route data between devices connected to the server 475. The transceiver may route data communicated between tank 480 and server 475 and between computing device 490 and server 475. For example, after determining a fish's weight, shape, size, and 3-D model, the computing device 490 may transmit, via transceiver, fish profile information 430A such as fish identification, score, rank, and weight information to a server 475.

Processor 496 may be coupled to the pose estimator 492, memory 494, and input/output device 498 for executing instructions to implement the methods described is this specification. In some implementations, executable instructions may be stored in the memory device 110. The processor 496 may be programmed by encoding an operation as one or more executable instructions and providing the executable instructions in the memory device 110. The processor 496 may include one or more processing units, e.g., without limitation, in a multi-core configuration. The term processing unit, as used herein, refers to microprocessors, microcontrollers, reduced instruction set circuits (RISC), application specific integrated circuits (ASIC), logic circuits, and any other circuit or device capable of executing instructions to perform operations described herein. The pose estimator 492 may be implemented as part of the processor 496 or electrically connected to the processor 496.

In some implementations, the server 475 may be implemented as a plurality of servers and various components of the server 475 may be distributed across the plurality of servers. Server 475 may be connected to computing device 490 through one or more networks. One or more operations of the method depicted in FIGS. 3A and 3B may be implemented in the computing device 490 or server 475 such that portions of the method may be executed by computing device 490 and other portions by server 475.

Server 475 may include any suitable computing device coupled to the one or more networks, including but not limited to a personal computer, a server computer, a series of server computers, a mini computer, and a mainframe computer, or combinations thereof. For example, server 475 may include a web server (or a series of servers) running a network operating system. In some implementations, the server 475 may be connected to or may be integrated with one or more databases, such as fish profile database.

Server 475 may also implement common and standard protocols and libraries, such as the Secure Sockets Layer (SSL) protected file transfer protocol, the Secure Shell File Transfer Protocol (SFTP)-based key management, and the NaCl encryption library. Server 475 may be used for and/or provide cloud and/or network computing. Although not shown in the figures, the server 475 may have connections to external systems providing messaging functionality such as e-mail, SMS messaging, text messaging, and other functionalities, such as encryption/decryption services, cyber alerts, etc.

The one or more networks may provide network access, data transport, and other services to the server 475. The one or more networks may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, the one or more networks may implement one or more of a GSM architecture, a General Packet Radio Service (GPRS) architecture, and a Universal Mobile Telecommunications System (UMTS) architecture. The one or more networks may implement a WiMAX architecture defined by the WiMAX forum or a Wireless Fidelity (WiFi) architecture. The one or more networks may include, for instance, a local area network (LAN), a wide area network (WAN), the Internet, a virtual LAN (VLAN), an enterprise LAN, a layer 3 virtual private network (VPN), an enterprise IP network, corporate network, or any combination thereof. In some implementations, the one or more networks may include a cloud system that provides Internet connectivity and other network-related functions.

Server 475 may be connected to or may be integrated with one or more databases, such as a fish profile database. The one or more databases may include a cloud database or a database managed by a database management system (DBMS).

A DBMS may be implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Oracle® database, IBM® DB2, Adaptive Server Enterprise, FileMaker®, Microsoft® Access®, Microsoft® Structured Query Language (SQL) Server, MySQL™ PostgreSQL®, MongoDB, Mondo/ES JavaScript Object Notification (JSON), and a NoSQL implementation. A DBMS typically includes a modeling language, data structure, database query language, and transaction mechanism. The modeling language may be used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, for example, one or more modules of computer program instructions encoded on a computer readable medium for execution by, or to control the operation of, data processing apparatus. The computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, for example, code that constitutes processor firmware, a protocol stack, a database management system, an operating system, or a combination of one or more of them. A propagated signal is an artificially generated signal, for example, a machine-generated electrical, optical, or electromagnetic signal that is generated to encode information for transmission to a suitable receiver apparatus.

A computer program, also known as a program, software, software application, script, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. A processor may include any suitable combination of hardware and software.

Elements of a computer may include a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. Moreover, a computer may be embedded in another device, for example, a user device. Computer-readable media suitable for storing computer program instructions and data include all forms of non-volatile memory, media and memory devices, including by way of example, semiconductor memory devices, such as EPROM, EEPROM, and flash memory devices; magnetic disks, for example, internal hard disks or removable disks; magneto optical disks; and CD ROM and DVD-ROM disks. The processor and the memory may be supplemented by, or incorporated in, special purpose logic circuitry.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

It should be understood that the phrase one or more of and the phrase at least one of include any combination of elements. For example, the phrase one or more of A and B includes A, B, or both A and B. Similarly, the phrase at least one of A and B includes A, B, or both A and B.

Thus, particular implementations have been described. Other implementations are within the scope of the following claims. For example, the actions recited in the claims may be performed in a different order and still achieve desirable results.

What is claimed is:

1. A computer-implemented method comprising:
   obtaining, by one or more processors, one or more images of a fish that were generated using a stereo camera;
   determining one or more key points associated with one or more features of the fish in the one or more images;
   generating, by the one or more processors, a three-dimensional (3D) model of the fish based on the one or more key points associated with the one or more features of the fish in the one or more images that were generated using the stereo camera;
   generating a quality score for the 3D model of the fish that reflects a utility of the 3D model of the fish in accurately determining the likely weight of the fish and that is based at least on an elevation angle of the fish in relation to the stereo camera;
   after determining that the quality score for the 3D model that reflects the utility of the 3D model of the fish in accurately determining the likely weight of the fish satisfies a threshold that is specific to a species of the fish or an environment in which the images of the fish were obtained, determining a likely weight of the fish using the 3D model of the fish; and
   outputting the likely weight of the fish for display or storage at a device connected to the one or more processors.

2. The computer-implemented method of claim 1, further comprising:

generating a single image from the one or more images;
generating a depth map for the single image; and
identifying the fish and one or more regions of interest in the single image by performing object detection using a recurrent convolutional neural network.

3. The computer-implemented method of claim 2, wherein:
the one or more key points associated with the one or more features of the fish are determined for each of the one or more regions of interest using pose estimation;
the stereo camera includes a left camera and a right camera; and
the one or more images include a left image and a right image.

4. The computer-implemented method of claim 2, wherein:
the determined one or more key points include one or more two-dimensional key points; and
generating the 3D model of the fish comprises determining three-dimensional key points for the fish by using the determined one or more two-dimensional key points and the depth map.

5. The computer-implemented method of claim 1, wherein determining a likely weight of the fish using the model of the fish comprises:
estimating the likely weight of the fish by applying a linear regression model to the model of the fish, the model of the fish being a three-dimensional model of the fish.

6. The computer-implemented method of claim 1, further comprising:
obtaining one or more secondary images of the fish using the stereo camera;
determining a likely secondary weight of the fish based on the obtained one or more secondary images of the fish; and
determining an average likely weight based on the determined likely weight of the fish using the 3D model of the fish and the determined likely secondary weight of the fish based on the obtained one or more secondary images of the fish.

7. The computer-implemented method of claim 1, further comprising:
training a neural network classifier using a pose estimation model to predict likely key points of the fish that are not visible in the one or more images of the fish and that are used to generate the 3D model.

8. A system comprising:
one or more computing devices and one or more storage devices storing instructions which when executed by the one or more computing devices, cause the one or more computing devices to perform operations comprising:
obtaining, by one or more processors, one or more images of a fish that were generated using a stereo camera;
determining one or more key points associated with one or more features of the fish in the one or more images;
generating, by the one or more processors, a three-dimensional (3D) model of the fish based on the one or more key points associated with the one or more features of the fish in the one or more images that were generated using the stereo camera;
generating a quality score for the 3D model of the fish that reflects a utility of the 3D model of the fish in accurately determining the likely weight of the fish and that is based at least on an elevation angle of the fish in relation to the stereo camera;
after determining that the quality score for the 3D model that reflects the utility of the 3D model of the fish in accurately determining the likely weight of the fish satisfies a threshold that is specific to a species of the fish or an environment in which the images of the fish were obtained, determining a likely weight of the fish using the 3D model of the fish; and
outputting the likely weight of the fish for display or storage at a device connected to the one or more processors.

9. The system of claim 8, wherein the operations further comprise:
generating a single image from the one or more images;
generating a depth map for the single image; and
identifying the fish and one or more regions of interest in the single image by performing object detection using a recurrent convolutional neural network.

10. The system of claim 9, wherein:
the one or more key points associated with the one or more features of the fish are determined for each of the one or more regions of interest using pose estimation;
the stereo camera includes a left camera and a right camera; and
the one or more images include a left image and a right image.

11. The system of claim 9, wherein:
the determined one or more key points include one or more two-dimensional key points; and
generating the 3D model of the fish comprises determining three-dimensional key points for the fish by using the determined one or more two-dimensional key points and the depth map.

12. The system of claim 8, wherein determining a likely weight of the fish using the model of the fish comprises:
estimating the likely weight of the fish by applying a linear regression model to the model of the fish, the model of the fish being a three-dimensional model of the fish.

13. The system of claim 9, wherein the operations further comprise:
obtaining one or more secondary images of the fish using the stereo camera;
determining a likely secondary weight of the fish based on the obtained one or more secondary images of the fish; and
determining an average likely weight based on the determined likely weight of the fish using the 3D model of the fish and the determined likely secondary weight of the fish based on the obtained one or more secondary images of the fish.

14. One or more non-transitory computer-readable storage media comprising instructions, which, when executed by one or more computing devices, cause the one or more computing devices to perform operations comprising:
obtaining, by one or more processors, one or more images of a fish that were generated using a stereo camera;
determining one or more key points associated with one or more features of the fish in the one or more images;
generating, by the one or more processors, a three-dimensional (3D) model of the fish based on the one or more key points associated with the one or more features of the fish in the one or more images that were generated using the stereo camera;
generating a quality score for the 3D model of the fish that reflects a utility of the 3D model of the fish in accurately determining the likely weight of the fish and that is based at least on an elevation angle of the fish in relation to the stereo camera;

after determining that the quality score for the 3D model that reflects the utility of the 3D model of the fish in accurately determining the likely weight of the fish satisfies a threshold that is specific to a species of the fish or an environment in which the images of the fish were obtained, determining a likely weight of the fish using the 3D model of the fish; and outputting the likely weight of the fish for display or storage at a device connected to the one or more processors.

15. The one or more non-transitory computer-readable storage media of claim 14, wherein the operations further comprise:

generating a single image from the one or more images;
generating a depth map for the single image; and
identifying the fish and one or more regions of interest in the single image by performing object detection using a recurrent convolutional neural network.

16. The one or more non-transitory computer-readable storage media of claim 15, wherein:

the one or more key points associated with the one or more features of the fish are determined for each of the one or more regions of interest using pose estimation;
the stereo camera includes a left camera and a right camera; and
the one or more images include a left image and a right image.

17. The one or more non-transitory computer-readable storage media of claim 15, wherein:

the determined one or more key points include one or more two-dimensional key points; and
generating the 3D model of the fish comprises determining three-dimensional key points for the fish by using the determined one or more two-dimensional key points and the depth map.

18. The one or more non-transitory computer-readable storage media of claim 14, wherein determining a likely weight of the fish using the model of the fish comprises:

estimating the likely weight of the fish by applying a linear regression model to the model of the fish, the model of the fish being a three-dimensional model of the fish.

19. The one or more non-transitory computer-readable storage media of claim 14, wherein the operations further comprise:

obtaining one or more secondary images of the fish using the stereo camera;
determining a likely secondary weight of the fish based on the obtained one or more secondary images of the fish; and
determining an average likely weight based on the determined likely weight of the fish using the 3D model of the fish and the determined likely secondary weight of the fish based on the obtained one or more secondary images of the fish.

20. The one or more non-transitory computer-readable storage media of claim 15, wherein the operations further comprise:

training a neural network classifier using a pose estimation model to predict likely key points of the fish that are not visible in the one or more images of the fish and that are used to generate the 3D model.

* * * * *